June 4, 1957 W. D. HOUGHTON 2,794,858

SYNCHRONIZING SYSTEM

Filed April 4, 1950 5 Sheets-Sheet 1

INVENTOR
William D. Houghton
BY
Charles H. Brown
ATTORNEY

INVENTOR
William D. Houghton
BY
Charles H. Brown
ATTORNEY

June 4, 1957 W. D. HOUGHTON 2,794,858

SYNCHRONIZING SYSTEM

Filed April 4, 1950

5 Sheets-Sheet 3

INVENTOR

William D. Houghton

BY

Charles H. Brown

ATTORNEY

INVENTOR
William D. Houghton
BY
Charles H. Brown
ATTORNEY

June 4, 1957 W. D. HOUGHTON 2,794,858

SYNCHRONIZING SYSTEM

Filed April 4, 1950 5 Sheets-Sheet 5

INVENTOR.
William D. Houghton
BY
Charles H. Brown 2,794,858
Patented June 4, 1957

2,794,858

SYNCHRONIZING SYSTEM

William D. Houghton, Port Jefferson, N. Y., assignor to Radio Corporation of America, a corporation of Delaware Application April 4, 1950, Serial No. 153,974

15 Claims. (Cl. 179—15)

Figure 1:
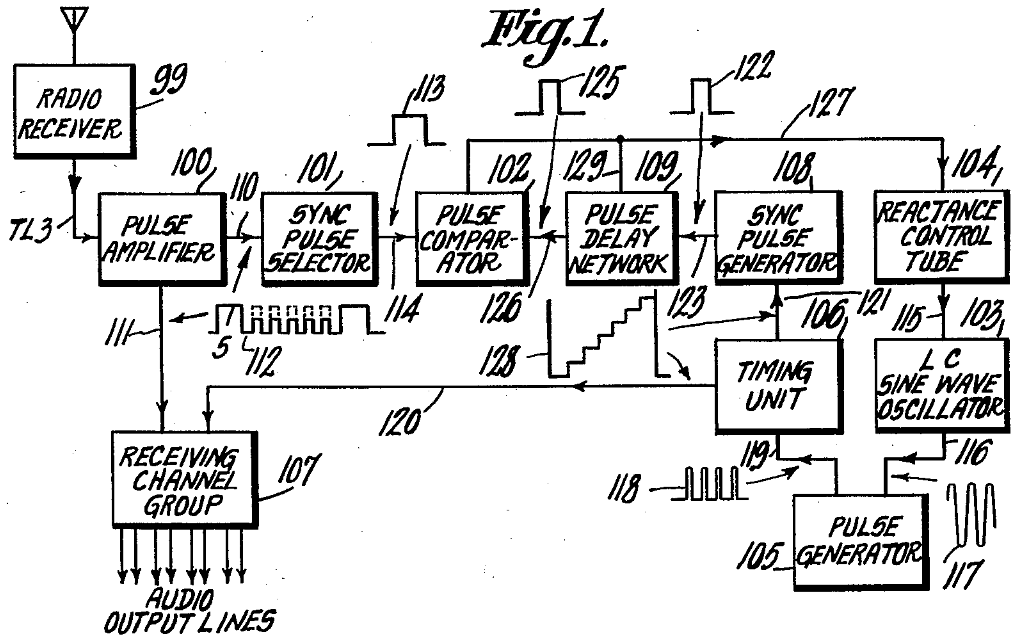

This invention relates to a method of and circuits for accurately synchronizing the operation of the receiving and transmitting apparatus in communication systems. In one of its aspects, the invention relates to an improved synchronizing arrangement at the receiver of a time division multiplex system.

In time division multiplex systems, as in the case of a three-color television system, wherein a common transmission medium is sequentially assigned to a plurality of branch circuits, it is desirable to maintain exact timing between the local radio receiver and the remotely located transmitter. A known method of accomplishing this timing is for the transmitter to send to the receiver a synchronizing pulse once for each frame or cycle of operations. The receiving equipment selects the synchronizing pulse and uses it to accurately control the operation of a receiver oscillator, either by a direct lock synchronizing scheme or by a time averaging synchronizing scheme.

In some direct lock synchronizing systems, a pulse oscillator at the receiver is tripped by the selected synchronizing pulse, and the resulting pulse produced by the tripped oscillator is used to drive the utilization circuits, such as a sawtooth wave generator in a television system or a step wave generator in some time division pulse multiplex systems. This method of synchronizing provides an accurate means of timing when the transmission medium or link circuit between the transmitter and the receiver is free from noise. However, the presence of noise in the link circuit between the transmitter and the receiver causes the direct lock synchronizing system to become inaccurate. This is because random noise pulses may trip the receiver oscillator too early or too late, depending upon the occurrence time of the noise pulse relative to the synchronizing pulse.

To reduce the effects of such noise, the time averaging synchronizing circuit was developed. In such a system, the selected synchronizing pulse is compared with a locally generated wave of a pre-determined shape in a manner such as to produce a D. C. (direct current) voltage. The magnitude of the D. C. voltage is made to be a function of the occurrence time of the selected synchronizing pulse with respect to a particular portion of the locally generated wave. The D. C. voltage thus obtained is used to control a reactance tube which, in turn, controls the frequency of the receiver oscillator. The receiver oscillator, in turn, produces the wave which is compared with the synchronizing pulse.

In the operation of this last system, the synchronizing pulse is usually made to occur in the middle of a rapidly changing portion of the wave generated in the receiver, and as the position or phase of the synchronizing pulse relative to the locally generated wave tends to vary, the D. C. voltage applied to the reactance tube varies in such sense and direction as to cause the frequency of the receiver oscillator to change in a direction to resist the phase change. This last system can be perfect only if there is infinite amplification of the D. C. voltage since there must be a change in position of the locally generated wave with respect to the received synchronizing pulse before a correcting change in the D. C. voltage is produced. In television, this change may be made small by suitable circuit arrangements. However, because the change does occur there also occurs a noticeable shift of the picture as the frequency of the transmitter or receiver changes slightly.

In time division multiplex systems, the shift in the occurrence time of the locally generated wave with respect to the received synchronizing pulse results in a change in the character or nature of the useable output from the individual branch circuits or channels. By proper choice of circuit components, this change may be reduced to negligible values. This change in output may appear as cross-talk, a condition which is undesirable and a major problem in time division multiplex systems.

An object of the present invention is to overcome the foregoing difficulties and to improve the operation of automatic frequency control circuits in the receiving equipment of time division multiplex systems wherein separate transmitter and receiver apparatus are designed to operate synchronously.

Another object is to control the timing of a locally generated pulse in receiver equipment with respect to a received synchronizing pulse to a greater degree of accuracy than is practical with conventional circuitry.

A further object is to accurately synchronize the receiving equipment of a pulse multiplex time division system in a highly advantageous and novel manner.

Still another object is to provide a circuit for comparing received synchronizing waves with locally generated waves and for automatically changing the phase of the locally generated waves to such an extent as to insure the same relative timing between both waves.

A still further object is to provide an automatic frequency control circuit for accurately controlling the frequency of a local generator in a receiver system in response to a received synchronizing pulse, in combination with circuitry for assuring a predetermined phase relation of the waves produced by the local generator relative to similar waves produced at a remote transmitter.

In time division multiplex systems presently known, a common transmission medium, such as a radio link or a direct wire line, is sequentially assigned to a plurality of branch circuits or channels for predetermined time intervals, preferably, though not necessarily, non-overlapping intervals. Each branch circuit or channel produces a pulse during the time interval assigned to it. The pulse produced in a channel is modulated in accordance with the message wave applied to that channel. The result is that a series of pulses is produced in the common transmission medium, and each pulse contains information obtained from a signal or modulating wave source coupled to the channel in which the pulse originates. Different modulating wave sources are connected to the different channels. The individual pulses may be modulated in regard to amplitude duration or timing, and these pulses may be made to modulate the frequency, phase or amplitude of a radio frequency carrier in a radio system. Such a radio system may, for example, be a radio relay system. It may be assumed, for purpose of exposition only, that the carrier is frequency modulated by the pulses produced in the multiplex system.

In these known multiplex systems, each channel circuit in both the transmitter and receiver includes a selector vacuum tube which is biased to be normally non-conductive. The different selector tubes in the different channel circuits are differently biased to become conductive at different voltage levels of an applied wave. Such an applied wave may be a sawtooth voltage wave or a step voltage wave. The sawtooth or step voltage wave (whichever it may be) is applied to all of the channel circuits in parallel relation, as a result of which the different selector tubes in the different channels become sequentially conductive. At the transmitter, the flow of current in each channel selector tube causes a pulse to be produced in that channel. This pulse is modulated by the intelligence for that channel. At the receiver, the flow of current in each channel selector tube enables that channel to become receptive to an incoming received pulse. The transmission of a synchronizing pulse in each frame or cycle of operations by the transmitter is utilized to maintain the operation of the sawtooth wave form generator or the step wave generator (whichever is used) at the receiver in synchronism with a similar generator at the transmitter. This synchronizing pulse has a characteristic which is different from the intelligence carrying channel pulses. As an example, the synchronizing pulse may have a duration greater than that of the channel pulses and an amplitude equal to the peak amplitude of the channel pulses under extremes of modulation.

Such time division multiplex systems employing step wave generators are described, for example, in my United States Patents 2,480,137 and 2,495,168, granted August 30, 1949, and January 17, 1950, respectively, and my copending application Serial No. 786,286, filed November 15, 1947, now U. S. Patent 2,543,738, issued February 27, 1951. A time division multiplex system employing sawtooth voltage generators is described in Butement et al. Patent 2,403,210, July 2, 1946.

The present invention is herein described in connection with a pulse amplitude modulated time division multiplex system employing a step voltage wave generator at the transmitter and a synchronously controlled step voltage wave generator at the receiver for controlling the different branch circuits or channels. It should be understood, however, that the principles of the invention are applicable to systems having other types of synchronously controlled generators and utilizing other types of modulation.

Briefly, the invention comprises an automatic frequency control circuit at the receiver for controlling the generator of locally produced waves, in combination with pulse comparator apparatus for comparing the timing of these locally produced waves with a received synchonizing wave. A variable time delay network is connected between the pulse comparator apparatus and the generator of the locally produced waves. The circuit arrangement is such as to produce a voltage in the comparator which is a function of the time difference between the two waves. This voltage serves a dual purpose. It controls the automatic frequency control circuit and also automatically controls the time delay network. The variation in the time delay is in such amount as to insure perfect timing or phasing between the locally generated waves and the received waves.

Figure 4:
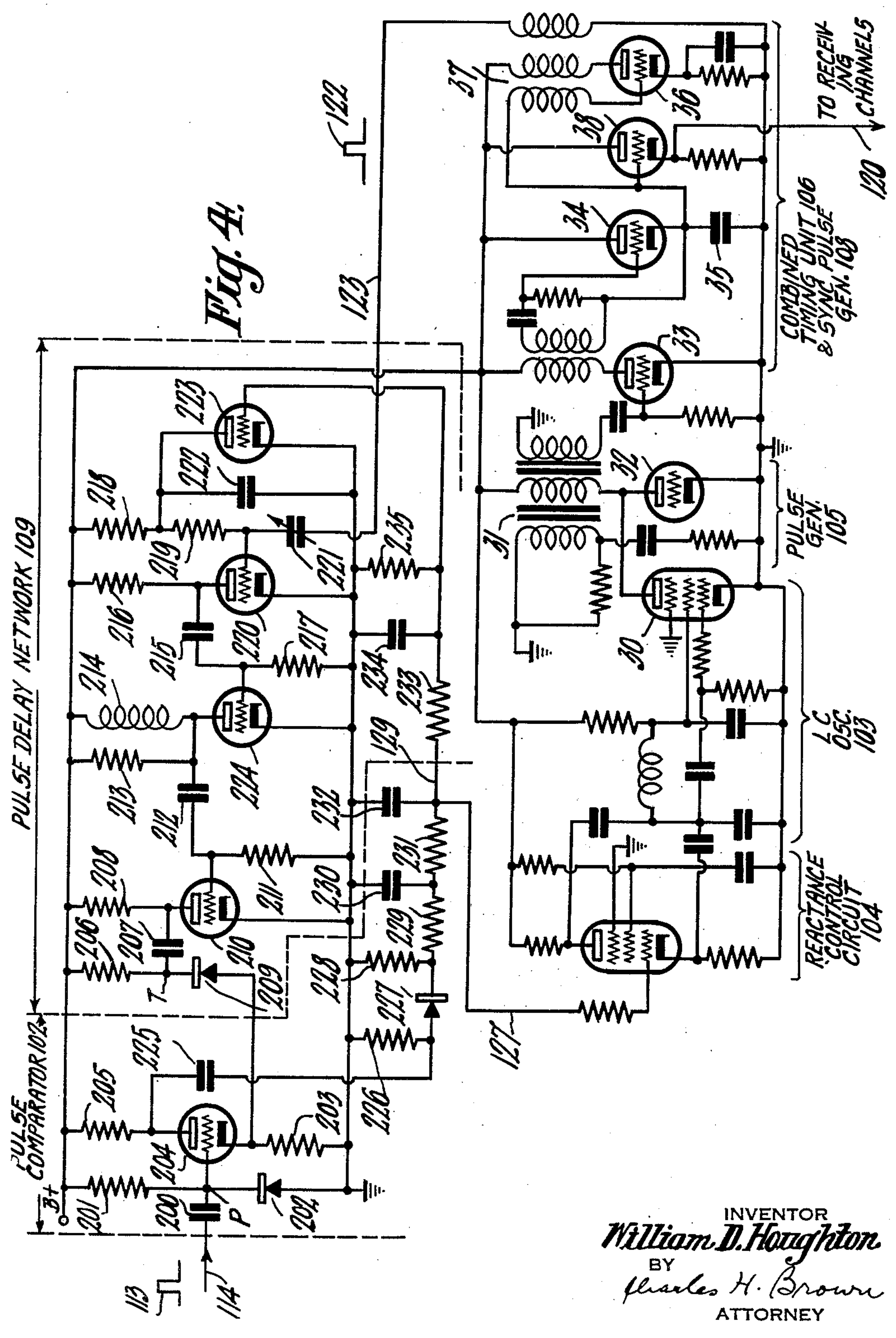
Figure 7:
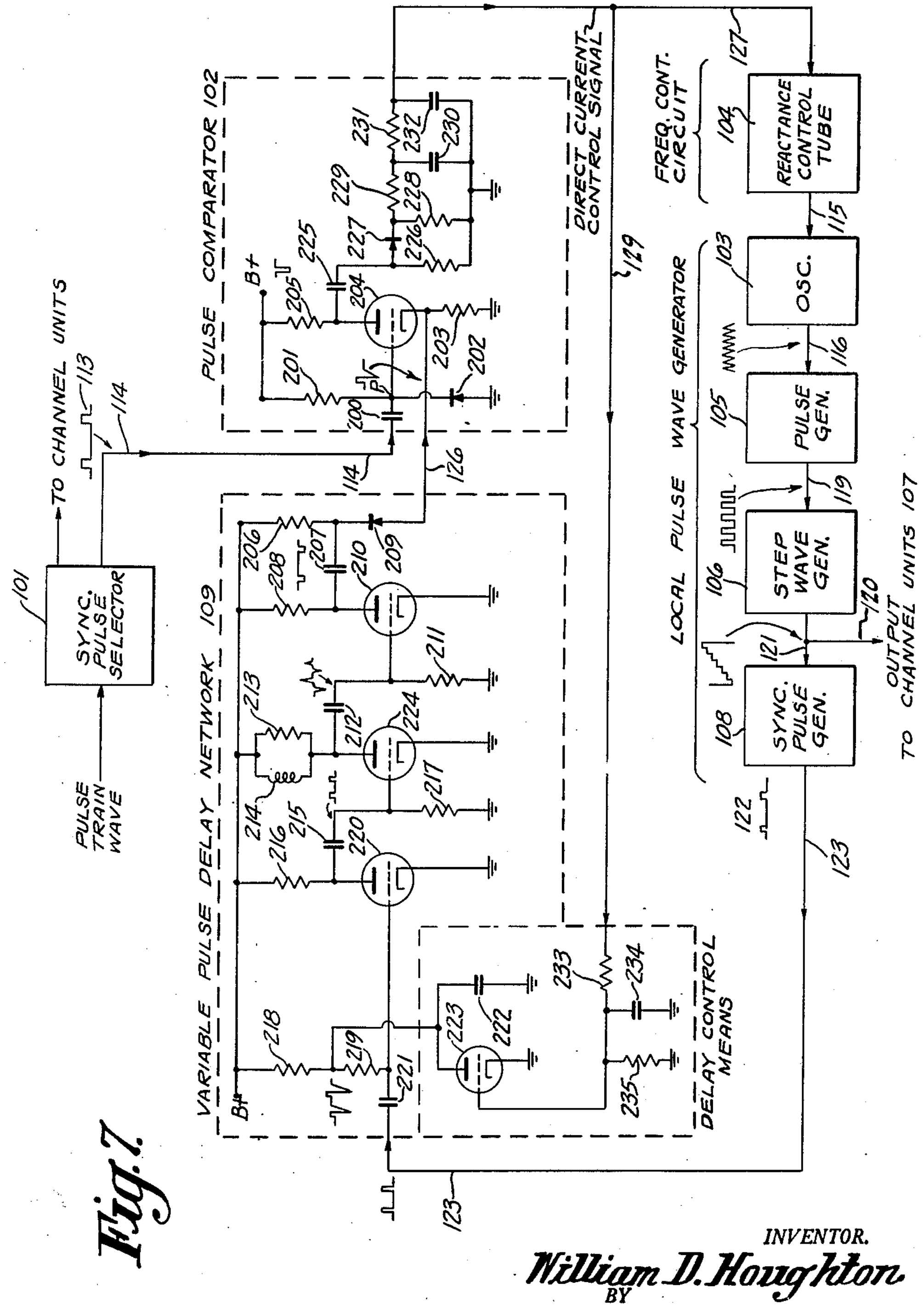

A more detailed description of the invention follows in conjunction with a drawing wherein:

Fig. 1 is a diagrammatic showing of the invention applied to the receiving terminal of a time division multiplex system;

Figs. 2, 3, 5 and 6 each disclose a series of curves given in explanation of the operation of the system of the invention. Each curve in each figure is appropriately labeled;

Fig. 4 illustrates the circuit details shown only diagrammatically in the hollow rectangles of the system of Fig. 1; and Fig. 7 shows the circuit of Fig. 4 in a rearranged form.

Throughout the figures of the drawing the same parts are represented by the same reference numerals.

Referring to the drawing in more detail, Fig. 1 shows the invention incorporated in the receiving portion of a time division multiplex system employing the principle of time averaging synchronizing, wherein the timing information is obtained from a plurality of synchronizing pulses and is then integrated and utilized to maintain synchronism between the transmitter and receiver apparatus.

The operation of the system of Fig. 1 is as follows:

The pulse train of video or D. C. pulses from the detected output of a radio frequency receiver 99 (for example a superheterodyne type of receiver) is coupled to a pulse amplifier 100 via transmission line TL–3. The amplified pulse train, shown in wave form 112, is coupled over lead 110 to a synchronizing pulse selector 101 and to a group of receiving channel circuits 107 over lead 111. The pulse train is shown as having a relatively wide synchronizing pulse S of constant amplitude followed by spaced shorter duration channel pulses, for a single frame or cycle of operations. The channel pulses have their amplitudes modulated by the intelligence signal.

The synchronizing pulse selector 101 selects the longer duration synchronizing pulse from the pulse train and separates the same from the shorter duration channel pulses, by virtue of the difference in length or duration of the pulses, and produces on lead 114 a pulse representative of the synchronizing pulse, as shown in wave form 113. Synchronizing pulse selectors or separators are well known in the art, reference being made for example to Fig. 3*a* of Day Patent 2,469,066; my U. S. Patent 2,480,582, granted August 30, 1949; and also to Fig. 6*a* of my copending application Serial No. 786,286, filed November 15, 1947, now U. S. Patent 2,543,738, issued February 27, 1951.

The output pulse from the sync pulse selector 101 is coupled to a pulse comparator 102 via lead 114. The synchronizing pulse selector 101 produces a pulse at the occurrence time of the received synchronizing pulse and remains unresponsive to the shorter duration channel pulses. A conventional type of reactance tube controlled LC oscillator 103 produces a sine wave 117 in lead 116, and this sine wave is passed on to a pulse generator 105. The pulse generator 105 is free running but locked-in or entrained by the output of LC oscillator 103, and produces short pulses with a repetition rate equal to the frequency of the output of the oscillator 103, as shown in wave form 118, on lead 119. These pulses on lead 119 are coupled to a timing unit 106.

The timing unit 106 includes a step wave generator which produces a riser or increment in the step voltage wave in response to each pulse impressed thereon by the pulse generator 105. Each pulse from pulse generator 105 causes a charge to be stored in the condenser of the step wave generator until a certain count is reached at which time the condenser is discharged.

The step voltage wave produced in timing unit 106 is shown in wave form 128. In a thirty channel time division multiplex system, in which the present invention was satisfactorily employed, the timing unit employed three sub step wave generators each producing a step voltage wave for a particular bank of receiving channels. Such an arrangement is described in my co-pending application Serial No. 786,286 Figs. 6*a* and 6*b*, supra, in which the three substep wave generators are discharged at the end of the received synchronizing pulse. The step voltage wave 128 generated by timing unit 106 is passed on to the group of receiving channel circuits 107 by lead 120, and this same step voltage wave is also passed on to a synchronizing pulse generator 108 by lead 121. Each riser in the step wave 128 applied to the channel group 107 causes one particular channel position selector to operate and allow the selection of a particular pulse from the pulse train 112 appearing on lead 111.

The rapidly negative-going portion at the end of the step voltage wave on lead 121 causes the synchronizing pulse generator 108 to produce a pulse as shown in wave form 122. The pulse output from the synchronizing pulse generator 108 is coupled to a pulse delay network 109 by lead 123. The output from delay network 109 is a pulse as shown in wave form 125. This output 125 is coupled to the pulse comparator circuit 102 by lead 126. The pulse delay network 109 provides a means for accurately positioning (phasing) the occurrence time of the step voltage wave 128 which controls the occurrence time of the channel position selector gate pulses.

The pulse comparator 102 compares to occurrence time of the received synchronizing pulse 113 appearing on lead 114 with that of the delayed locally generated pulse 125 appearing on lead 126, and produces a D. C. voltage on lead 127 whose amplitude is a function of the time difference between the two pulses 113 and 125. The D. C. output voltage from the pulse comparator 102 is utilized to control a reactance control tube circuit 104 over lead 127. The reactance control tube automatically controls the frequency of the LC oscillator 103 by the information it supplies to lead 115.

In normal operation, the frequency of the LC sine wave oscillator 103 is maintained at a value such that the pulse on lead 126 in the output of the delay network 109 has the same repetition rate as the received synchronizing pulse 113. The D. C. controlling voltage from the pulse comparator 102 is of the correct value to maintain this condition when the locally generated pulse 125 and the received synchronizing pulse 113 bear the proper time relationship.

The action of the synchronizing circuits may be more fully explained with reference to the series of curves of Fig. 2. A vertical line through all wave forms in Fig. 2 indicates the same instant of time.

Fig. 2*a* represents the sine wave output from the LC oscillator 103, and Fig. 2*b* represents the pulse output from the pulse generator 105.

Fig. 2*c* shows the step voltage wave generated by the timing unit 106 and appearing on leads 120 and 121.

Fig. 2*d* represents a channel gate pulse generated in one channel (it is assumed, by way of example only, that the particular channel selected is adjusted to select pulse number 2 in pulse train input 112) in receiving channel group 107.

Fig. 2*e* represents the pulse train output from pulse amplifier 100 as it appears on leads 110 and 111. The dotted pulses indicate the maximum and minimum amplitude values of the channel pulses under extremes of modulation. It should be noted that the duration of the synchronizing pulses is three times that of the channel pulses, and that it is assumed there are five intelligence carrying channels. Obviously, there may be fewer or a considerably greater number of channels.

Fig. 2*f* indicates the pulse output from the synchronizing pulse selector or separator 101. These last pulses occur near the end of the synchronizing pulses shown in Fig. 2*e*. The reason for this is that the synchronizing pulse selector must first determine whether the applied pulse is the synchronizing pulse or a fully modulated channel pulse. Therefore, it cannot produce a pulse until after the time required for a single channel pulse has passed.

The solid line pulses shown in wave form Fig. 2*g* represent the pulse output from the receiver synchronizing pulse generator 108. It will be noted that this pulse occurs at the time of the discharge of the step voltage wave of Fig. 2*c*. The dotted line pulse shown in Fig. 2*g* represents the delayed synchronizing pulse from the output of the pulse delay network 109. The arrows in Fig. 2*g* indicate that the time between the solid line pulse and the dotted line pulse is variable depending upon the adjustment of the pulse delay network 109.

The action of the pulse comparator 102 is shown in Fig. 2*h*. The solid line curve in Fig. 2*h* represents the wave form generated within the comparator 102 due to the output wave 113 from the sync pulse selector 101. Stated in other words, wave 113 has been converted within the comparator 102 to the wave of Fig. 2*h*. The dotted line pulse in Fig. 2*h* indicates the occurrence time of the output pulse from the pulse delay network 109 under normal operating conditions.

It will be seen that the peak amplitude of the dotted line pulse shown in Fig. 2*h* will vary with respect to the horizontal line marked zero as its occurrence time changes with respect to the solid line curve. This horizontal line represents a zero voltage condition. By using a peak detection device in the pulse comparator 102 (described in detail in connection with Fig. 4), a D. C. voltage is obtained on lead 127. The value of the D. C. voltage is therefore a function of the occurrence time of the dotted line pulse with respect to the solid line wave in curve 2*h*.

It will now be seen that any change in the frequency of the LC oscillator 103 will result in a change in frequency of the step voltage wave output 128 from the timing unit 106. Such a frequency change in wave 128 causes a change in frequency in the pulse output from the sync pulse generator 108 and from pulse delay network 109. A frequency change in the oscillator 103 thus results in a time shift of the dotted line pulse with respect to the solid line wave of curve 2*h* and this is accompanied by a voltage change in the D. C. output from the pulse comparator 102. The D. C. voltage appearing on lead 127 affects the reactance control tube circuit 104 in such manner as to restore the frequency of the LC oscillator 103 to its original frequency. When the circuit is operating normaly, the pulse from the delay network 109 is held on the negative sloping side of that wave generated in the comparator 102 resulting from the selected synchronizing pulse produced by the sync pulse selector 101. The receiver is thus "locked-in" with the transmitted synchronizing pulse.

From the foregoing it will be seen that perfect timing cannot be obtained unless the pulse comparator 102 is infinitely sensitive or there is infinite amplification of the D. C. voltage applied to the reactance control tube 104. That is, there must first be a shift in timing before a change in the control voltage occurs. From the wave forms of Figs. 2*a* to 2*h* it will be seen that the shift in timing results in a time shift of all of the waves shown in curves 2*b* to 2*d*. The shift in timing of the gate pulse curve 2*d* will result in a change in the amplitude of the signal output from that channel, and, where cross-talk balancing is used, will result in an increase in cross-talk between one channel and another occupying a different time interval. All other channels in the channel group 107 are similarly affected because they are controlled by the same step voltage wave 128.

By changing the time delay between the solid line pulse and the dotted line pulse of curve 2*g* in the correct direction and by an amount equal to the shift in timing required for frequency correction, extremely accurate or perfect timing may be had of the channel gate pulse (curve 2*d*) with respect to the modulated channel pulse. This adjustment is made automatically in accordance with the invention. Such adjustment is made by the connection 129 extending from lead 127 to the pulse delay network 109. A portion of the D. C. voltage appearing on lead 127, supplied thereto by the pulse comparator 102, is coupled into the pulse delay network 109 via lead 129. The manner in which this result is achieved is described later.

Figure 2:
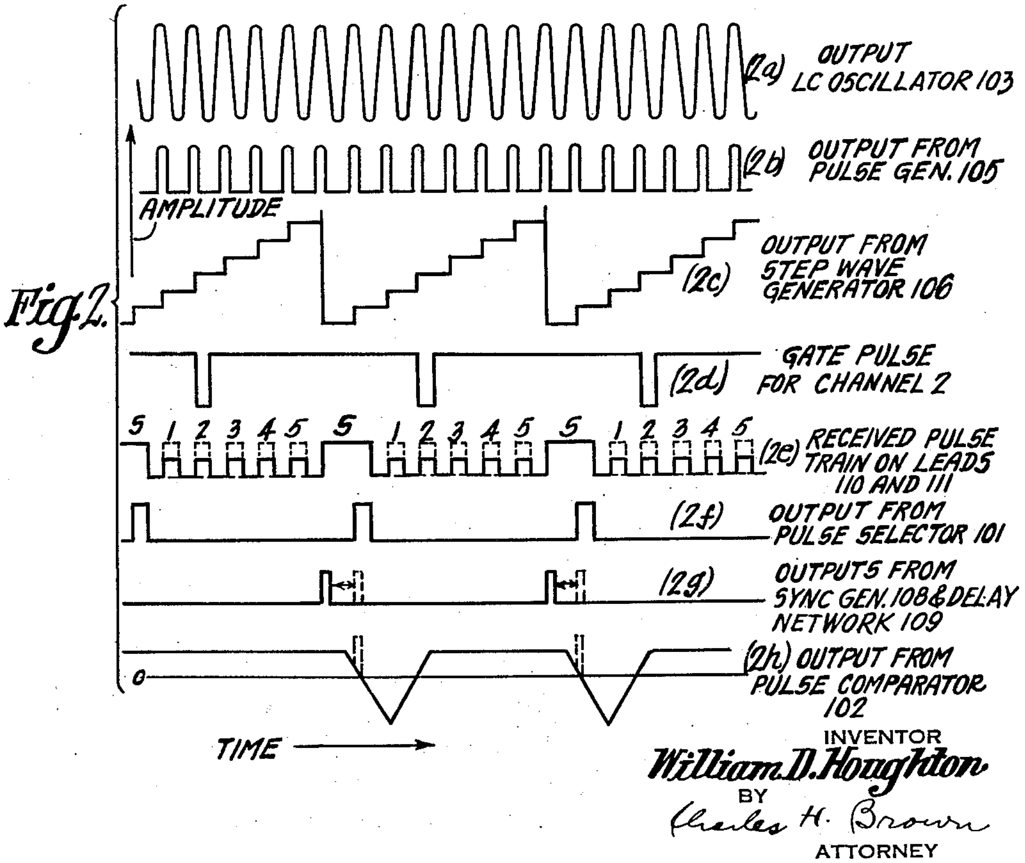
Figure 3:
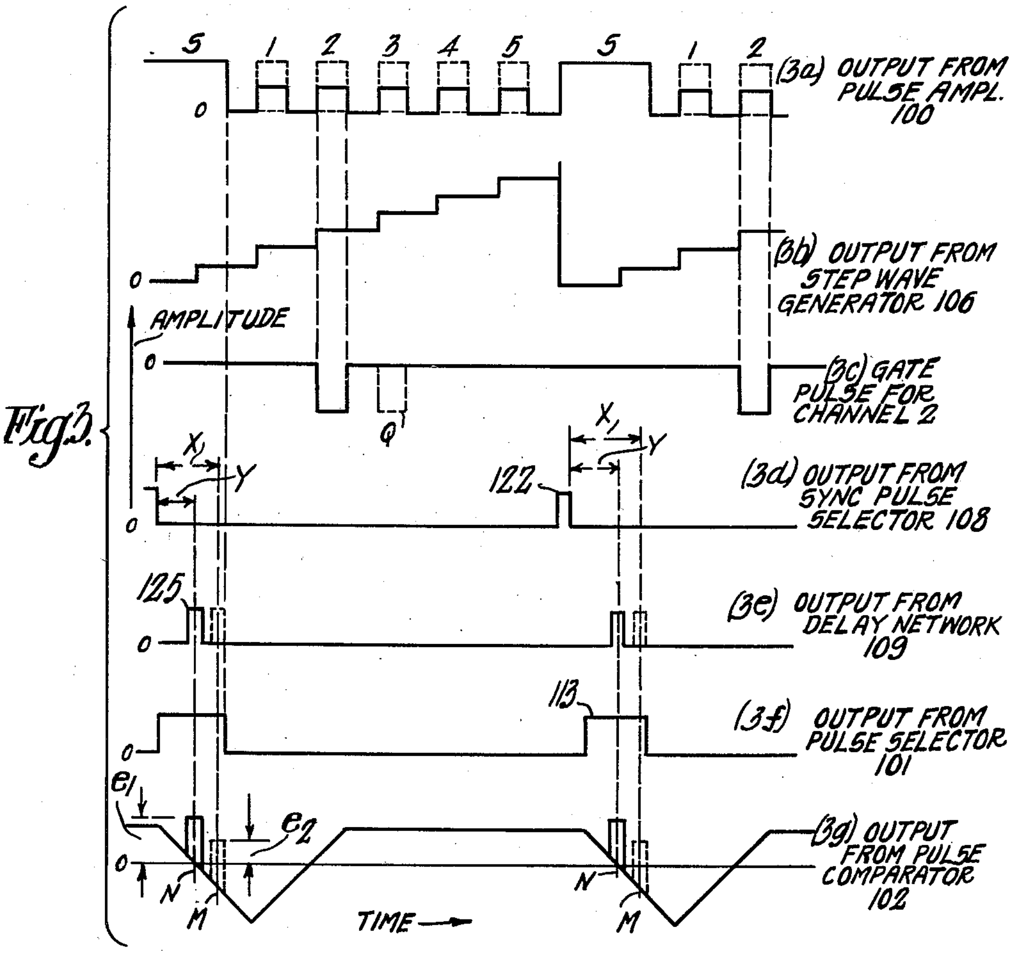

Fig. 3, curves 3*a* to 3*g*, is an amplified showing of the curves 2*a* to 2*h* of Fig. 2. Curve 3*a* represents the pulse train output 112 from the pulse amplifier 100 and corresponds to the showing of Fig. 2*e*. Curve 3*b* (Fig. 3) shows the step wave output 128 from the timing unit 106 and corresponds to the showing of Fig. 2*c*. Curve 3*c* (Fig. 3) represents the channel pulse selector wave form set to select channel number 2. Curve 3*d*, Fig. 3, shows the wave form of pulse 122 in the output of the synchronizing pulse generator 108. Curve 3*e*, Fig. 3, shows the delayed pulses 125 from the pulse delay network 109. The wave form 113 of curve 3*f*, Fig. 3, is the pulse generated by the synchronizing pulse selector 101. Curve 3g, Fig. 3, shows the wave form generated within the pulse comparator 102.

In normal operation, the delayed pulse 125 shown in curves 3e and 3g occurs at time N, and the D. C. voltage developed by the pulse comparator 102 will have a value $e_1$, shown in curve 3g. The normal time delay of the pulse delay network 109 is equal to the value Y in curve 3d. If the frequency of the LC oscillator 103 should try to drift with respect to the frequency of the received synchronizing pulses, then the reactance control tube 104 would require a different voltage in order to maintain the LC oscillator 103 on the desired frequency. If the voltage required for this purpose is $e_2$, as shown in curve 3g, then the delayed pulse 125 should occur at time M instead of time N. If the time delay between the pulse 122 of curve 3d and the pulse 125 of curve 3e remained equal to Y then the channel gate pulse would fall at time Q as shown by the dotted line pulse in curve 3c. This would result in the gate pulse occurring at the time of occurrence of channel pulse 3 instead of at the time of channel pulse 2 in wave form 112 of curve 3a. However, if the time delay is made equal to X (Fig. 3d) when the delayed pulse falls at time M, then the position of the channel gate pulse remains unchanged.

In accordance with the invention, the pulse delay network 109 is automatically changed in such direction and extent as to compensate for the undesired shift in timing between the received synchronizing pulses and the locally generated synchronizing pulse 122. In other words, as the narrow pulse on the leading edge or slope of the wave form in curve 3g moves from position N to M, the time delay is automatically changed from Y to X as shown in curve 3d, and the pulse in the output from the delay network 109 appears in the dotted line position M of curve 3e. It will thus be seen that network 109 is, in effect, an automatic phase delay network.

Figure 5:
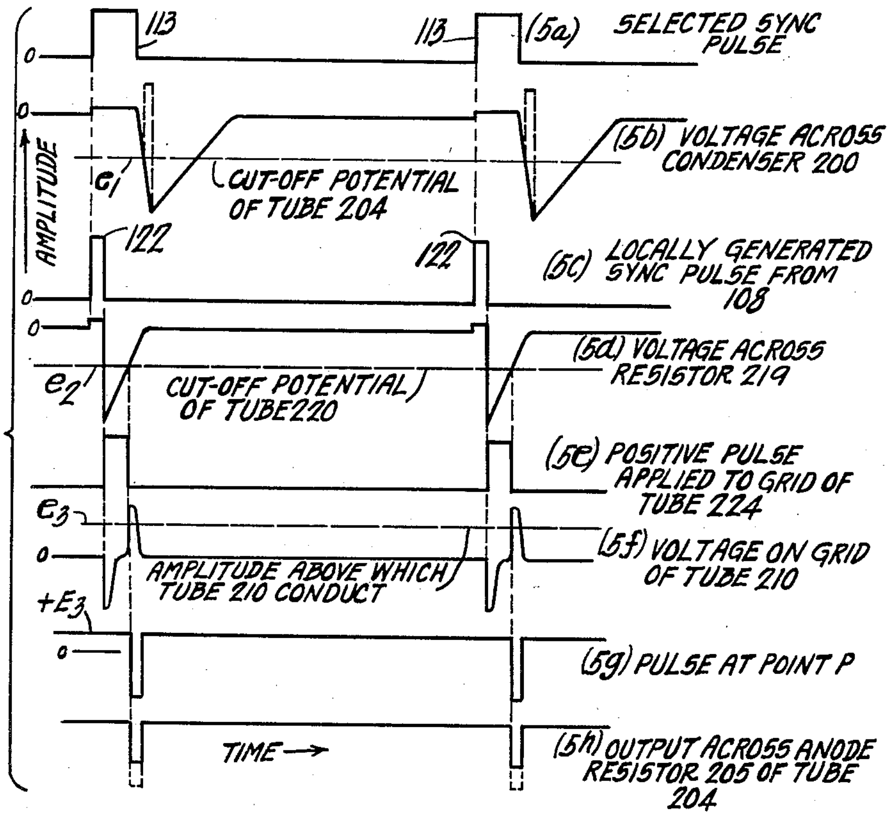

Fig. 4 is a circuit diagram showing how the pulse delay network 109 and pulse comparator 102 accomplish the desired automatic time delay in accordance with the invention. Curves 5a to 5h of Fig. 5 are wave forms given to aid the explanation of Fig. 4.

The selected synchronizing pulse 113 shown in curve 5a is coupled via input terminal 114 and through a small value coupling condenser 200 to the junction point P of the grid of vacuum tube 204, the anode of a diode rectifier 202 and resistor 201. The time constant of the circuit combination of capacitor 200 and resistor 201 should be small compared to the time interval between successive synchronizing pulses to effect a differentiating action. When the pulse 113 is present on the input terminal 114, electron current flows from ground through diode 202 to that plate of condenser 200 which is connected to the grid of tube 204, thus storing a charge in capacitor 200. After the applied pulse 113 ceases, the charge stored in 200 starts to leak off through resistor 201 developing a voltage thereacross (negative with respect to ground or zero voltage condition), as shown in Fig. 5b. Dotted line e–1 indicates the cut-off potential of tube 204. In the absence of an input pulse 113 a small amount of current flows through diode 202 and resistor 201 in series, producing a reference potential at point P of a value approximately zero.

Tube 204 is normally non-conducting due to cathode bias developed across resistor 203 resulting from electron current flowing over a path from ground through resistor 203, diode 209 and resistor 206 to B+. Since the wave developed on the grid of tube 204 at the termination of pulse 113 is negative relative to zero, tube 204 does not conduct unless it is keyed on by the locally generated synchronizing pulse which is made to appear on lead 123. Diode 202 is caused to cut-off wherever the wave shown in Fig. 5b is less than zero amplitude.

The manner in which tube 204 is made to conduct is as follows: The locally generated synchronizing pulse 122 shown in waveform 5c is applied to lead 123 and then to the grid of vacuum tube 220 through a small coupling condenser 221. The time constant of condenser 221 and resistor 219 should be small compared to the time interval between adjacent synchronizing pulses. In effect, condenser 221 and resistor 219 constitute a differentiating circuit together with tube 220. Tube 220 is normally conducting and each locally produced synchronizing pulse 122 causes electron grid current to flow from the cathode of tube 220 to the grid-plate of condenser 221, storing a charge therein. After the applied synchronizing pulse 122 ceases, the charge stored in condenser 221 leaks off through resistor 219, developing a voltage wave form as shown in curve 5d, Fig. 5, between the grid of tube 220 and ground. The horizontal dashed line e–2 indicates the cut-off potential of tube 220. Therefore, tube 220 is cut-off for the time interval during which the voltage on its grid is below the cut-off potential e–2. The result is a positive voltage pulse developed between the grid of vocuum tube 224 and ground, as shown in wave form curve 5e. Tube 224 is normally non-conducting due to grid leak bias developed across resistor 217. Each positive pulse developed on the anode of tube 220 causes electron grid current in tube 224 to flow to that plate of condenser 215 which is connected to the grid of tube 224, thereby storing a charge in condenser 215. During the time interval between pulses, this charge starts to leak off through resistor 217, developing a bias thereacross sufficient to maintain tube 224 cut off. The time constant of condenser 215 and resistor 217 is made large compared to the time interval between successive locally generated synchronizing pulses. The result is that tube 224 passes anode current only for the duration of the pulse applied to its grid. Coil 214 in the anode circuit of tube 224, together with a damping resistor 213, forms a differentiating network which produces a negative pulse at the leading edge of the anode current wave and a positive pulse at the end of the anode current wave.

The value of resistor 213 is such as to critically damp the inductance 214. The voltage appearing on the grid of vacuum tube 210 is shown in curve 5f, Fig. 5. Tube 210 is normally non-conducting due to grid leak bias developed across resistor 211 in a manner similar to that heretofore described for tube 224. Therefore, tube 210 conducts only on the positive peak of the wave shown in curve 5f. The horizontal dashed line e–3 indicates the amplitude above which tube 210 conducts. Whenever tube 210 conducts, negative pulse, shown in curve 5g, appears at the junction point T of resistor 206, condenser 207 and diode 209. The amplitude of the negative pulse is sufficient to reduce the anode potential of diode 209 to a value lower than its cathode, thus causing diode 209 to cut off. This action removes the cut-off bias from tube 204 and allows it to conduct. Normally, tube 204 conducts at a time interval midway on the negative-going sloping portion of the wave applied to the grid of tube 204 as indicated by the dotted line pulses in curve 5b. These dotted line pulses in curve 5b merely indicate the time of conduction of tube 204 due to the application of pulses at point T whenever tube 210 conducts.

When tube 204 conducts, a negative pulse as shown in curve 5h, is developed across the anode resistor 205. This negative pulse is coupled to the cathode of diode 227 through a coupling condenser 225. Resistor 226 forms a ground return path for the cathode of diode 227 and resistor 228 forms a ground return path for the anode of this diode 227. A filter network consisting of resistors 229 and 231 and condensers 230 and 232 removes the pulse frequency components from the output of the diode rectifier and provides a D. C. voltage on lead 127 which is coupled to the grid of the reactance control tube circuit 104. From an examination of the curve 5b, it will appear that if diode 209 is made to cut-off at a time when the voltage applied to the grid of tube 204 is below the cut-off potential *e*–1, then tube 204 cannot conduct and no pulse can be produced at the anode of tube 204. Similarly, if diode 209 is made to cut-off at a time when the voltage applied to the grid of tube 204 is approximately zero, then a maximum amplitude negative pulse will be developed at the anode of tube 204, as indicated by the dotted line pulse of curve *5h*. Under normal operating conditions, diode 209 is made to cut-off at a time corresponding to a point-intermediate the top and bottom extremes of the negative-going slope of wave form curve *5b*. The amplitude of the D. C. voltage developed by the diode rectifier 227 and its associated filter network is a function of the peak negative pulse amplitude appearing across resistor 226 and therefore a function of the relative timing of the selected sync pulse 113 and the locally generated synchronizing pulse 122. When the locally generated synchronizing pulse falls midway on the negative-going portion of the wave shown in curve *5b*, the D. C. voltage is of the proper amplitude to cause the locally generated synchronizing pulse to have the same frequency as the received synchronizing pulse. Any change in relative timing between pulses 113 and 122 results in a change in the D. C. voltage in a direction such as to cause the LC oscillator 103 to be tuned to a frequency which resets the timing shift, as previously explained. A portion of the D. C. voltage developed on lead 127 is coupled over lead 129 through another filter network, consisting of resistor 233 and condenser 234, to the grid of vacuum tube 223. Tube 223 forms part of the automatic time delay network.

Figure 6:
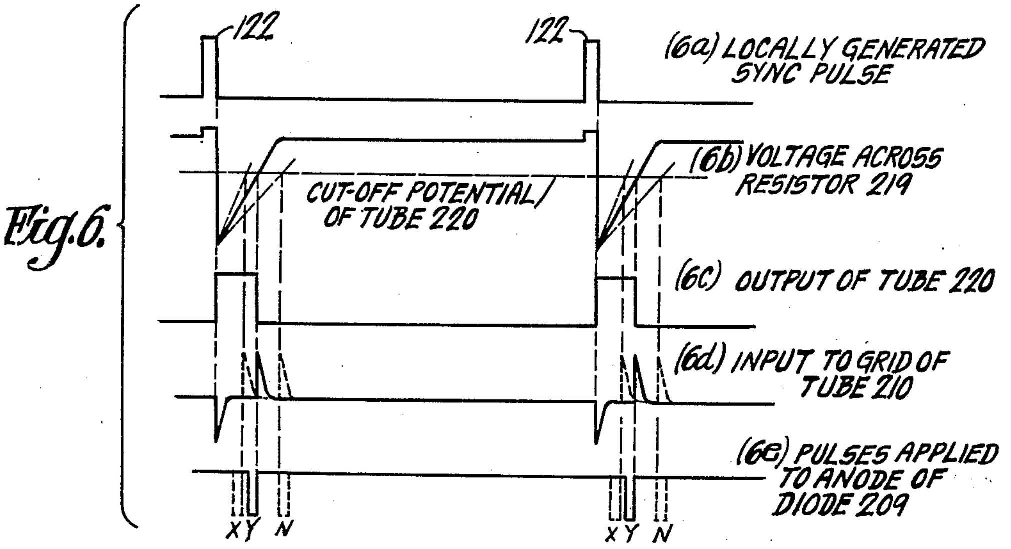

With reference to Figs. 4 and 6, the operation of the automatic time delay circuit is as follows. The locally generated synchronizing pulses 122 applied to the grid of tube 220 are represented by waveforms in curve *6a* of Fig. 6. Each pulse causes grid current to flow in the grid circuit of tube 220 thus storing a charge in condenser 221. In normal operation, the discharge of condenser 221 through grid leak 219 develops a voltage on the grid of tube 220 as shown by the solid line curve *6b*. Under these normal conditions, the tube 223 has a particular D. C. voltage applied to its grid resulting in a particular value of anode potential. It will be noted that the anode potential of tube 223 is also the voltage applied to one end of the grid leak resistor 219. Condenser 222 is a by-pass condenser which filters any undesired frequency components passed by tube 223.

It will be seen that if the grid voltage of tube 223 is varied, the anode potential will change. This results in a change in voltage applied to the grid leak 219, which in turn changes the discharge time of condenser 221. This action is shown in curve *6b* which shows the voltage across resistor 219. The solid line curve indicates the normal condition and the dotted line slopes indicate the conditions when the voltage applied to the grid leak resistor 219 is more or less than normal. The horizonal dash-dot line indicates the cut-off potential of tube 220.

Curve *6c* represents the wave form at the grid of tube 224, and curve *6d* represents the wave form at the grid of tube 210. Curve *6e* represents the negative pulses applied to the anode of diode 209. It will be seen that if the bias on the grid of tube 223 is made more negative than normally, the anode potential will rise and the time of discharge of condenser 221 will be more rapid. The result of this last condition is a shorter duration pulse applied to the grid of tube 224. The positive portion of the pulse across coil 214 will occur sooner than normal, resulting in the negative pulse applied to the anode of diode 209 at point T occurring earlier than normal as shown at time X in the wave forms of curve *6e*. The same reasoning may be used to demonstrate that a voltage less negative than normal applied to the grid of tube 223 will result in the pulse applied to the anode of diode 209 occurring at time N in the wave form of Fig. *6e*.

The LC oscillator 103 includes a vacuum tube 30 which carries current on the positive peaks of the sine wave applied to its control grid. The pulses of current passed by tube 30 are coupled to the central winding of a pulse transformer 31, as a result of which positive pulses are applied to the grid of a normally non-conducting grid-leak biased vacuum tube 32. The windings on transformer 31 are so poled that when tube 32 starts to draw current, the current therein increases and causes grid current to flow at which time tube 32 immediately cuts off in typical pulse or blocking oscillator fashion. Positive pulses are produced on the third winding of pulse transformer 31 and these are coupled to another normally non-conducting grid-leak biased vacuum tube 33 in the timing unit 106. Tube 33 is, in effect, a driver or buffer amplifier between the step voltage wave generator in the timing unit 106 and the pulse generator 105. The step wave generator in timing unit 106 includes a normally non-conducting grid-leak biased vacuum tube 34 which is driven by the vacuum tube 33. The cathode of tube 34 is directly connected to a condenser 35 across which increments of voltage are developed as a result of pulses being applied to the tube 34 by the buffer amplifier 33.

The step voltage wave developed across condenser 35 is coupled through one winding of a pulse transformer 37 to the grid of a normally non-conducting cathode biased vacuum tube 36. The bias applied to the cathode of tube 36 has such value that tube 36 will not conduct until the step voltage wave developed across condenser 35 exceeds a predetermined voltage value corresponding to the maximum voltage value of the step wave. The windings on pulse transformer 37 are so poled that feedback occurs when tube 36 starts to draw current. The result of this feedback is that the grid of tube 36 is driven positive and grid current flows through the grid winding of pulse transformer 37, thereby discharging condenser 35 and ending one complete cycle of the step voltage wave. A normally conducting vacuum tube 38 is used as a conventional cathode output buffer amplifier to couple the step voltage wave thus developed to the individual channel units. When vacuum tube 36 passes current, it produces a pulse on lead 123 which is passed on to the pulse delay network 109. In effect, tube 36 with its associated components, constitutes the sync pulse generator 108 of Fig. 1. Because of the inter-relation of the tubes 33, 34 and 36, and their circuit components, they have been labeled in Fig. 4 as the combined timing unit 106 and sync pulse generator 108.

Fig. 7 shows the circuit of Fig. 4, which is a portion of the block diagram of Fig. 1, in a rearranged form to facilitate an easier understanding of the invention. It will be noted from Fig. 7, that a local pulse wave generator is constituted by the oscillator 103, the pulse generator 105, the timing unit or step wave generator 106 and the synchronizing pulse generator 108. An output from the local pulse wave generator is taken on the lead 120 for utilization by the receiving channel units 107. (A different form of utilization device might dictate the use of an output from the local pulse wave generator taken from the synchronizing pulse generator 108 over lead 123.) An output from the local pulse wave generator is taken on lead 123 and applied to the input of variable pulse delay network 109. The output of variable pulse delay network 109 is applied over lead 126 to the input of pulse comparator 102. A synchronizing pulse wave from synchronizing pulse selector 101 is also applied to a second input of the pulse comparator 102 over a lead 114. The pulse output of tube 204 in the pulse comparator 102 is rectified by diode 227 and filtered by elements 228 thru 232 to provide a direct current control signal or correction signal output from the pulse comparator 102. This direct current output is applied over lead 127 to the input of a reactance control tube 104. The output of reactance control tube 104 is applied over lead 115 to the oscillator 103 in the local pulse wave generator to control the frequency generated therein.

As thus far described, Fig. 7 shows a local pulse wave generator the output of which is passed thru a variable pulse delay network 109 to the input of the pulse comparator 102. Pulse comparator 102 is also receptive to a synchronizing pulse wave from synchronizing pulse selector 101. The pulse comparator 102 generates a direct current control signal having a value which is a function of the time difference between the synchronizing and delayed local pulses applied thereto. The frequency control loop operates to automatically maintain the frequency of the local pulse wave generator equal to the frequency of the synchronizing pulse wave.

The direct current control signal from the pulse comparator 102 is also applied over a lead 129 to a delay control means in the variable pulse delay network 109. The delay control means includes a filter or delay circuit 233, 234 and 235, a delay control tube 223 and a capacitor 222. The delay of the local pulse wave in going thru the variable pulse delay network 109 is controlled by the magnitude of the direct current control signal applied to the delay control means. This second control loop including the pulse comparator 102, the delay control means and the variable pulse delay network 109 controls the phase of the local pulse wave with relation to the phase of the synchronizing pulse wave. The filter or delay circuit 233, 234 and 235 in the phase control loop insures that the frequency control loop will operate prior to the phase control loop when a correction is required.

For an explanation of the operation of the circuit of Fig. 7, consider that the system is operating so that perfect synchronism exists between the output of the local pulse wave generator and the applied synchronizing pulse wave. Under this condition, the synchronizing pulse wave and the delayed local pulse wave applied to the pulse comparator 102 are in a time relationship such that the direct current control signal from the pulse comparator 102 is of exactly the correct value to keep the local pulse wave generator in synchronism and to provide a proper predetermined amount of delay in the variable pulse delay network 109. This represents one stable condition of operation.

Now assume that some change has taken place in the circuit such as, for example, a change in temperature affecting the operation of the circuit or a change in the value of some circuit component. After the circuit has adjusted itself to these changes and has become stabilized, the direct current control signal applied to the reactance control tube 104 to maintain the frequency of the local pulse wave generator in synchronism with the received synchronizing pulse wave, may be of a different value than it was under the first-mentioned stable condition. The different direct current control signal is also applied to control the delay in the variable pulse delay network 109, to provide a different delay therein. This different delay in the delay network 109 is required to provide the time difference between the delayed local pulse and the synchronizing pulse wave to create the required different direct current control signal from the output of pulse comparator 102.

Under both of the above-mentioned different stabilized conditions of this circuit, the phase of the local pulse wave from the output of the local pulse wave generator is the same with relation to the synchronizing pulse wave. The phase of the local pulse wave is unaffected by the requirement for a different direct current control signal to keep the local pulse wave generator in synchronism with the synchronizing pulse wave. This is because the delay encountered by the local pulse wave in going thru the variable pulse delay network 109 is automatically adjusted by the direct current control signal applied to the delay control means. Stated another way, there does not have to be a phase shift between the local pulse wave and the synchronizing pulse wave to cause the generation of a different required direct current control signal. The local pulse wave remains fixed in phase relative to the synchronizing pulse wave and the delayed local pulse wave is shifted in phase relative to the synchronizing pulse wave to effect the required direct current control signal.

If, in the transition from the first above-mentioned stable condition to the second condition, a larger direct current control signal is required to maintain the local pulse wave in synchronism with the synchronizing pulse wave, the larger direct current control signal also changes the delay of the local pulse in the variable pulse delay network 109 in a direction such as to further increase the resulting direct current control signal. The delay circuit 233, 234 and 235 is inserted in the phase control loop so that the frequency control loop can act to restore the frequency before the phase control loop acts to change the delay in the variable pulse delay network 109. In the absence of the delay circuit 233, 234 and 235, the phase control loop would run away with itself, each increment of control signal causing a further increment in the control signal. By taking into account the various time constants in the frequency and phase correction loops, the circuit is made to generate a local pulse wave accurately fixed in frequency and phase relative to the applied synchronizing pulse wave over a very considerable range.

It will thus be seen that by means of the present invention it is possible to achieve perfect timing (phasing) between a locally generated wave and a received wave, by combining a novel automatic time delay circuit with an automatic frequency control circuit.

The present invention is useful not only in multiplex systems employing speech waves or other modulation on different channels, but is also useful in a three-color television system in which the received horizontal sync pulses are compared with locally generated pulses. It is also useful in ordinary black and white television receivers to provide more accurate timing of the receiver horizontal deflection generator. A known type of television system utilizes 15,750 horizontal sync pulses per second based on present RMA Television Standards of 525 lines per frame and 30 frames per second.

What I claim is:

1. A synchronizing system for a pulse generator in a receiver, including means to receive synchronizing pulses transmitted by a remotely located transmitter, a local pulse generator, pulse delay apparatus having an input circuit coupled to the output circuit of said local pulse generator to produce pulses in response to the pulses produced by said local pulse generator but delayed for a period of time with respect thereto, a pulse comparator having an input circuit to which said received synchronizing pulses are applied and another input circuit coupled to the output circuit of said delay apparatus to produce an output voltage of magnitude proportional to the difference in time between the received synchronizing pulses and the delayed locally generated pulses, an automatic frequency control circuit having an output coupled to said local pulse generator and an input to which the output voltage of said comparator circuit is applied, and means also to apply said output voltage to said pulse delay apparatus to vary the occurrence time of the delayed pulses proportionally to the magnitude of said output voltage.

2. A synchronizing system for receiving equipment, comprising a circuit for separating the received synchronizing wave from other received waves, a wave generator, a variable phase delay network coupled to said generator, circuit means coupled to the output of said synchronizing wave separating circuit and to the output of said delay network for producing a voltage whose magnitude is a function of the difference in timing of the waves appearing on both of said outputs, a frequency correction circuit coupled to said circuit means and responsive to said voltage for controlling the frequency of operation of said wave generator, and another circuit also coupled to said circuit means and responsive to said voltage for varying the delay in said delay network.

3. A system in accordance with claim 2, characterized in this, that said delay network includes a plurality of tandem coupled electron discharge device circuits responsive to a wave impressed on the input of said network for producing another wave at the output of the network whose time of occurrence is delayed relative to the impressed wave.

4. A system for synchronizing equipment operating in response to application of an electric signal having synchronizing pulses interposed in a train of pulses modulated in accordance with the intelligence to be transmitted, including a synchronizing selector circuit coupled to said signal input circuit for separating the synchronizing pulses from the pulses which carry modulation, a pulse comparator coupled to the output of said synchronizing selector circuit, an oscillation generator, a reactance control circuit coupled to said oscillation generator for controlling the frequency thereof, a pulse generator coupled to the output of said oscillation generator and producing a pulse for each wave produced by said oscillation generator, a step voltage wave generator coupled to and controlled by said pulse generator, an electron discharge device circuit coupled to said step voltage wave generator and responsive to the maximum amplitude of said step voltage wave for discharging said step wave and substantially simultaneously therewith producing a pulse, a phase delay network between the output of said electron discharge device circuit and said pulse comparator for delivering to said comparator a pulse which is delayed relative to the pulse impressed on said network by said discharge device circuit, and means coupled to the output of said comparator for varying the delay of said network in accordance with variations in said comparator output.

5. A system in accordance with claim 4, including a group of modulation utilization circuits coupled to said signal input circuit for receiving said intelligence modulated pulses and a connection from said step voltage wave generator to said utilization circuits whereby the step voltage wave on said last connection is effective to cause said utilization circuits to become sequentially operative.

6. In combination in a system operating in response to application of an electric wave signal having synchronizing pulses interposed in a train of intelligence modulated pulses, a signal input circuit, an oscillation generator, means for converting the oscillations produced by said generator into spaced electrical pulses, means for controlling the frequency of said oscillation generator as a function of the time delay between said synchronizing pulses and said spaced electrical pulses, said means including: a pulse comparator upon which is impressed said synchronizing pulses, a variable phase delay network coupled between said comparator and said first means, an automatic frequency control circuit coupled between the output of said comparator and said oscillation generator, and a circuit responsive to the output of said comparator for varying the amount of delay in said network independently of said automatic frequency control circuit, said comparator comprising an electrical circuit for producing a voltage whose magnitude is a function of the difference in timing of said signal waves and the waves passing through said delay network.

7. In combination in a receiving system operating in response to application of an electric wave signal having synchronizing pulses interposed in a train of intelligence modulated pulses, a signal input circuit, an oscillator, a pulse generator for converting the oscillations produced by said oscillator into spaced electrical pulses, means for controlling the frequency of said oscillator as a function of the time delay between said synchronizing pulses and said spaced electrical pulses, said means including: a pulse comparator connected to said input circuit and upon which is impressed said synchronizing pulses, a delay network coupled between said comparator and generator, an automatic frequency control circuit coupled between the output of said comparator and said oscillator, and a circuit responsive to the output of said comparator for varying the amount of delay in said network independently of said automatic frequency control circuit.

8. A circuit arrangement for synchronizing a locally-generated wave with a given wave, including a comparator circuit to which said given and said locally generated waves are applied, a variable time delay circuit arranged to apply said locally-generated wave to said comparator circuit after a time delay, said comparator circuit being arranged to produce a direct potential proportional to the time phase between said given wave and the time delayed locally-generated wave, and means to apply said potential to said delay circuit to vary the extent of the time delay provided thereby.

9. In a circuit arrangement for synchronizing a locally-generated wave with a given wave, a comparator circuit to which said given and said locally-generated waves are applied, a variable time delay circuit coupled to said comparator circuit to delay the application of said locally-generated wave to said comparator circuit, said comparator circuit developing a direct potential proportional to the time phase between said given wave and the time delayed locally-generated wave, and means to apply said direct potential to said time delay circuit to vary the extent of the time delay provided by said circuit.

10. An electronic circuit arrangement for comparing the phase relationship between the time of occurrence of a given and a predetermined pulse train, including an electron discharge device having a cathode, a control electrode and an anode, a variable time delay network coupled to said electron discharge device, means to apply said predetermined pulse train to said time delay network, means to apply said given pulse train to the control electrode of said electron discharge device, a unilateral impedance device interposed between said time delay network and the cathode of said electron discharge device, means to bias said unilateral impedance device to maintain the control electrode of said electron discharge device at a potential whereby said device is rendered conducting only when pulses from both of said trains are applied, means to derive an output voltage from said device, and means to apply said output voltage to said time delay network to vary the extent of the time delay interposed thereby.

11. A circuit arrangement for synchronizing a locally-generated wave with a given wave, including a comparator circuit to which said given wave is applied, a generator circuit producing a wave of the same form as said given wave, a variable time delay circuit having the input thereof coupled to said generator circuit and the output coupled to said comparator circuit to apply the output wave of said generator to said comparator circuit after a time delay, said comparator circuit developing a direct current proportional to the time phase between said given wave and the time delayed locally-generated wave, means to apply a portion of said direct current to said generator circuit in a manner tending to render said locally-generated wave in phase coincidence with said given wave, and means to apply a portion of said direct current to said delay circuit to vary the extent of the time delay provided thereby.

12. A circuit arrangement for generating a local pulse train in synchronism with a given pulse train including a comparator circuit to which said given pulse train is applied, a generator circuit producing said locally-generated pulse train, a variable time delay circuit having the input thereof coupled to said generator circuit and the output coupled to said comparator circuit to apply the output pulse train of said generator to said comparator circuit after a time delay, said comparator circuit developing a direct potential proportional to the time phase between said given and said time delayed pulse train and means to apply said direct potential to said generator circuit to render said locally-generated pulse train in phase coincidence with said given pulse train, and means to apply said potential to said delay circuit to vary the extent of the time delay by an amount equal to the shift in timing required for phase coincidence between said waves.

13. An automatic synchronizing and phasing system comprising, a synchronizing pulse wave source, a local pulse wave source and variable delay means coupled to the output thereof, a pulse comparator receptive to said synchronizing pulse wave and to said local pulse wave to generate a correction signal, means responsive to said correction signal to maintain the frequency of said local pulse wave source equal to said synchronizing pulse wave source, and means also responsive to said correction signal to vary the time delay of said delay means, the phase of said local pulse wave being maintained constant relative to said synchronizing pulse wave despite changes in phase between the delayed local pulse wave and the synchronizing pulse wave, which changes are required to cause the generation of the value of correction signal providing frequency synchronization, whereby said local pulse wave is maintained in synchronism with said synchronizing pulse wave and in fixed phase relation therewith.

14. An automatic synchronizing and phasing system comprising: a frequency control loop including, in the order named, a local wave source, a variable delay means, a wave comparator to generate a control signal, and a frequency control means to control the frequency of said local wave source; a synchronizing wave source coupled to said wave comparator; said control signal having a magnitude determined by the time difference between the synchronizing wave and the delayed local wave; and means responsive to said control signal to vary the delay of said delay means and maintain the phase of said local wave source constant relative to said synchronizing wave.

15. In an automatic frequency control system, a frequency control loop wherein a frequency control signal is developed to maintain a local wave source equal in frequency to a received synchronizing wave, said frequency control signal having a magnitude determined by the time difference between the two waves, a variable delay means in said loop, and means responsive to said control signal to vary the delay of said delay means and maintain the phase of said local wave source constant relative to said synchronizing wave.

References Cited in the file of this patent

UNITED STATES PATENTS

| | | |
|---|---|---|
| 2,279,660 | Crosby | Apr. 14, 1942 |
| 2,292,944 | Hudec | Aug. 11, 1942 |
| 2,352,541 | Harper | June 27, 1944 |
| 2,429,613 | Deloraine et al. | Oct. 28, 1947 |
| 2,460,112 | Wright et al. | Jan. 25, 1949 |
| 2,501,368 | White | Mar. 21, 1950 |
| 2,505,040 | Goodall | Apr. 25, 1950 |
| 2,589,254 | Hoeppner | Mar. 18, 1952 |
| 2,592,061 | Oxford | Apr. 8, 1952 |
| 2,616,049 | Bailey | Oct. 28, 1952 |

FOREIGN PATENTS

| | | |
|---|---|---|
| 957,197 | France | Feb. 14, 1950 |